UNITED STATES PATENT OFFICE.

RALPH W. TIPTON, OF INDIANOLA, IOWA.

SEED-GRADER.

1,125,603.  Specification of Letters Patent.  Patented Jan. 19, 1915.

Application filed September 2, 1913. Serial No. 787,802.

*To all whom it may concern:*

Be it known that I, RALPH W. TIPTON, a citizen of the United States, and resident of Indianola, in the county of Warren and State of Iowa, have invented a new and useful Seed-Grader, of which the following is a specification.

The object of my invention is to provide a seed grader of simple and durable construction, particularly adapted for use in connection with or as an attachment to a clover or timothy threshing machine.

A further object is to provide a seed grader of the kind mentioned, having screens constructed and arranged to separate timothy, clover and other seeds.

Still a further object is to provide a seed grader adapted to separate timothy and clover seeds and after their separation to subject them to a draft from a single fan.

Still a further object is to provide means for imparting vibratory motion to the framework carrying the riddles or screens.

Still a further object is to provide means for directing and controlling the currents of air from the fan.

My invention consists in certain details, in the construction, combination and arrangement of the various parts of the device, whereby the objects contemplated are attained, as hereinafter more fully set forth, pointed out in my claims and illustrated in the accompanying drawings, in which—

Figure 1:
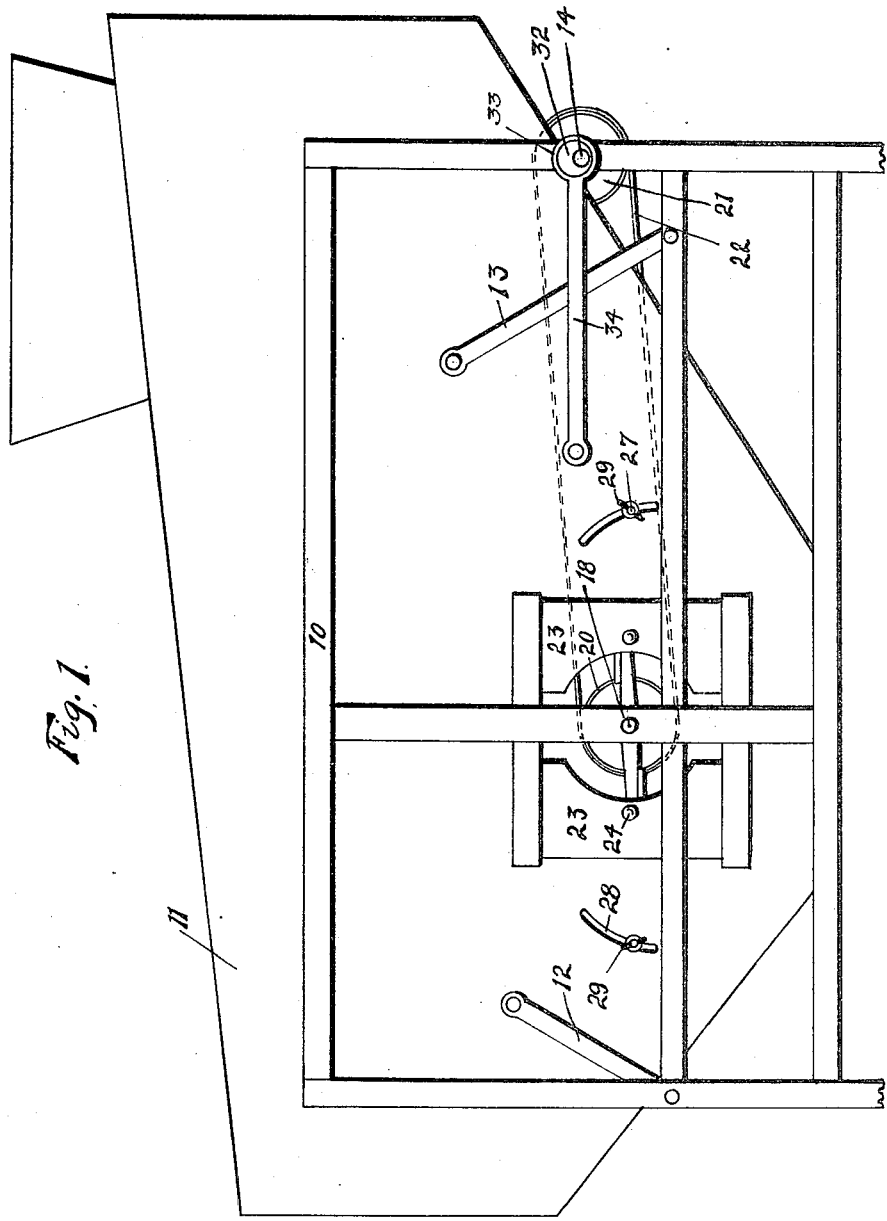
Figure 2:
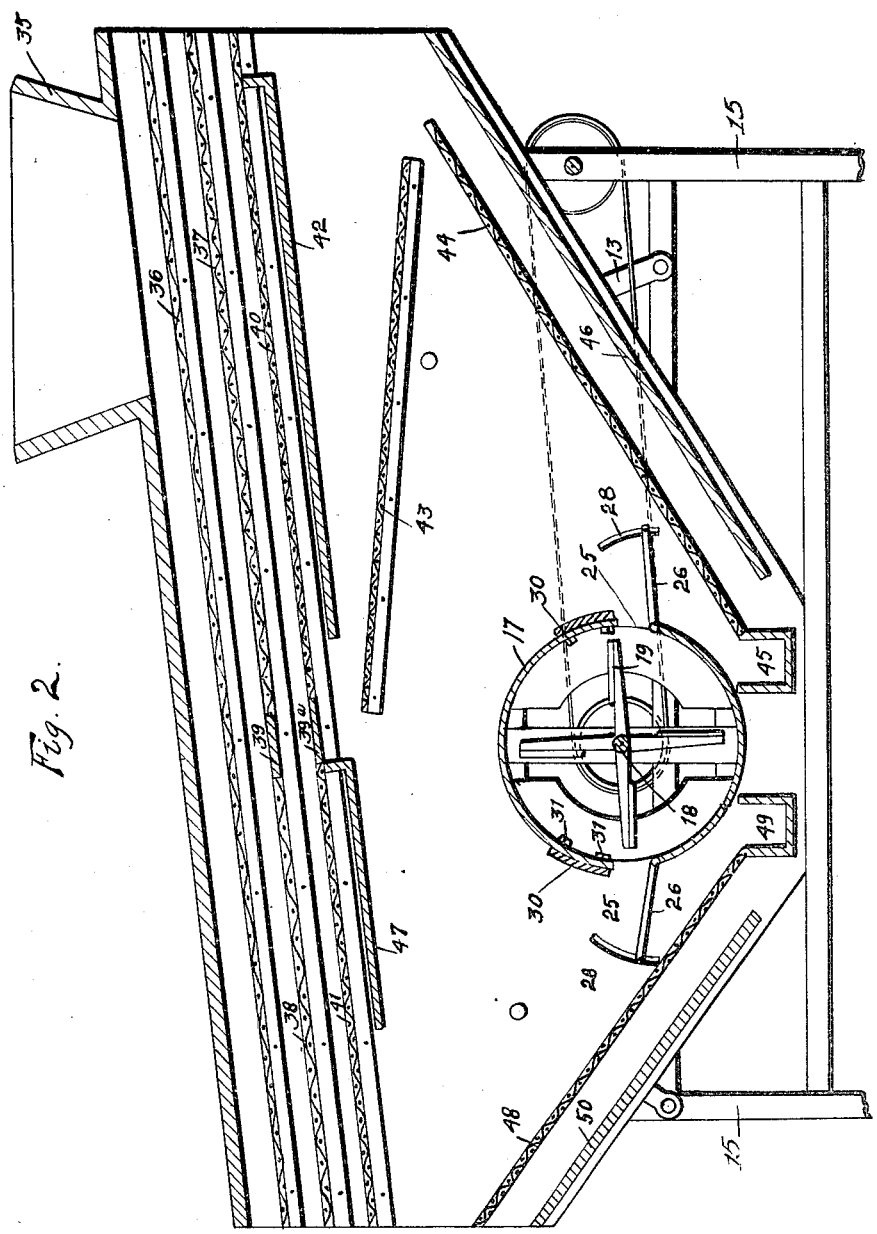

Figure 1 shows a side elevation of a seed grader, embodying my invention, and Fig. 2 shows a central, longitudinal, vertical, sectional view through my improved seed grader.

In the accompanying drawings I have used the reference numeral 10 to indicate generally the frame on which my improved seed grader is mounted or supported. The riddles and operating mechanism are inclosed within a casing 11, the bottom of which is inclined from its ends downwardly and approximately toward the center of said casing and may be open at its lower end. On each side the casing 11 is supported upon the frame 10 by means of swinging links 12 and 13. The links 12 at one end of the casing 11 are shorter than the links 13 at the other end for the purposes which will be hereinafter described.

Mounted on the frame is a shaft 14. Mounted within the casing 11 is a casing 17 of substantially cylindrical form, the particular description of which will be hereinafter more fully set forth. Within the casing 17 a transverse shaft 18 is mounted upon the frame 10. On the shaft 18 is a fan 19. On the shaft 18 is a belt pulley 20 in line with the belt pulley 21 on the shaft 14. A belt 22 travels on the pulleys 20 and 21. At the ends of the casing 17 are end members 23, which are slidably adjustable and may be opened to permit air to enter the casing 17 from the ends thereof. On the end members 23 are handles 24 for sliding said end members. Formed in the casing 17, on each side thereof, are horizontal longitudinal openings 25. Hinged to the casing 17, along the lower edge of each opening 25 is a wing member 26 which may be swung upwardly or downwardly upon its hinged points for directing and controlling the current of air driven by the fan through the opening 25. The construction of the wing members 26 on each side of the casing 17 may be substantially similar.

Secured to the edge of each wing member 26 is a bolt 27 which extends through a curved slot 28 in the wall of the casing 11 and is screw threaded at its outer end to receive a thumb or wing nut 29. By means of the bolt 27 and the nut 29 the wing members 26 may be secured to the casing 11 in any position of their movement. Slidably mounted on the walls in the casing 17, above each of the openings 25, is a movable cover member 30. The cover members 30 may be mounted in any suitable way. Bolts may be secured to them and extended through slots in the casing 17. The said bolts should be screw threaded to receive thumb nuts 31, whereby the cover members 30 may be secured to the casing 17 in any position of their movement. The casing 17 is large enough to permit the vibratory motion hereinafter described even though the casing 17 is mounted on the casing 11 and the fan 19 is mounted on the frame 10. For imparting vibratory motion to the casing 11 I have provided an eccentric 32, which is fixed off center on the shaft 14. Mounted on the eccentric 32 is a collar 33, secured to an arm 34, which is pivoted to the casing 11. I provide a similar eccentric and arm on each side of the casing 11.

I will now describe the arrangement of the riddles or screens in the casing 11. I provide a hopper 35 at the top of the casing 11, near one end thereof. Receiving seed discharged from the hopper is a riddle or screen 36, the openings in which are comparatively large. Straw and large material is discharged from the lower end of the screen 36. As shown and as preferably constructed the end of the casing 11, at which the hopper is situated, is slightly higher than the other end. Arranged in line with each other and parallel with the screen 36, below said screen 36, are screens 37 and 38. The screen 37 is below the upper portion of the screen 36 and the screen 38 is below the lower portion thereof. The screens 37 and 38 are separated by the frame member 39. The screen 37 is of finer mesh than the screen 38 and is of proper mesh to permit timothy seed and similar seeds to pass through it but not large enough to permit clover seed to pass through it. The screen 38 is of finer mesh and passes the clover seed. Heavier or larger material is discharged at the lower end of the screen 38. Below the screen 37 is a screen 40, designed to further separate the clover and timothy seed and below the screen 38 is a similar screen 41. The screens 40 and 41 respectively are of slightly finer mesh than the screens 37 and 38. Below the screen 40 is a solid bottom 42, whereby the grain which has passed through the screen 40 and is carried to points approximately in the middle of the seed grader and is discharged upon the screen 43. The screens hereinbefore described, except the screen 43, are all inclined from the hopper end of the machine downwardly and toward the other end. The screen 43 is inclined from the middle of the machine downwardly and toward the hopper end thereof. As the grain passes through and drops below the screen 43 it is subjected to a current or draft of air from the opening 25 in one side of the casing 17 and dirt and fine chaff are blown outwardly while the seed drops upon the screen 44. The screen 44 is of very fine mesh, such as will not permit timothy seed to pass through but large enough to permit the passage of red top and other very small seed. The timothy seed passes downwardly from the screen 44 into the receptacle 45. Red top and other fine seed and fine dirt discharged through the screen 44, are dropped upon the board 46 and discharged on the ground or into a suitable receptacle. The upper portion of the screen 41 has a solid bottom 47 which carries the seed discharged through the screen 41 toward the lower end of the casing 11 and drops it in position to be caught by the draft of air from the fan. The clover seed, after being subjected to said draft of air, is then dropped upon the screen 48, which permits very fine seed or fine dirt to pass through. The clover seed is discharged in the receptacle 49 and the dirt and the like is discharged upon the inclined bottom 50 from whence it passes to the ground or to suitable receptacles.

In the practical operation of my improved seed grader, the shaft 18 is connected with any suitable source of power. Thereby the fan is operated and the shaft 18 is rotated, whereby the casing 11 is vibrated. On account of the fact that the links 13 are longer than the links 12 a peculiar motion is imparted to the riddles or screens, whereby they are vibrated from end to end and one end is raised higher than the other. The material on the screens is thereby thoroughly agitated. Material is fed to the upper screen 36 through the hopper 35. Some of the grains pass through the upper end of the screen 36 upon the screen 37. Other grains pass through the lower end of the screen 36 upon the screen 38. Straw and larger material is discharged as tailings from the lower end of said screen 36. The screen 37, as hereinbefore mentioned, is of proper mesh to permit timothy seed to pass through it. The larger clover seed will not pass through the screen 37 although the smaller clover seed may sometimes do so.

Any clover seed which passes through the screen 37 is too large to pass through the screen 40 and on account of the vibration is carried downwardly over the partition 39ª between the screens 40 and 41 to the screen 41. Timothy seed and smaller seed pass through the screen 40 to the solid bottom 42 by which they are carried to the upper end of the screen or riddle 43. The seed dropping through the screen 43 is subjected to the blast of air from the fan whereby it is cleaned and separated from dust, chaff and fine particles. Timothy seed dropped upon the screen 44 is conveyed to the receptacle 45 while finer seed, such as red top, passes through the screen 44 and is discharged upon the inclined bottom 46. Clover seed, passing through the screen 38, is discharged therethrough upon the screen 41 and thence downwardly upon the bottom 47 or past the end thereof, when it is subjected to the blast of air from the fan. Clover seed dropping upon the screen 48 is discharged into the receptacle 49 while dirt and finer particles pass through said screen and are discharged upon the bottom 50.

It will be understood that conditions in threshing clover and timothy seed vary considerably and I have, therefore, provided the wings 26 for directing and regulating the draft from the fan 19.

It will readily be seen that by varying the position of the sliding cover members 30 the amount and strength of the draft may be varied as desired. In some cases it may be desired to close one of the openings 25 entirely and this can be done by means of the cover member 30.

My improved seed grader has a large number of advantages, many of which may be readily seen from the foregoing description. The arrangement of the screens for separating the clover and timothy seeds is believed to be new and to furnish proper and effective means for accomplishing the purpose. The arrangement of the finer screens for separating red top and finer seeds from timothy is believed to accomplish a result not worked out by any of the graders or threshing machines now made. By the arrangement of my screens I am also enabled to use the same fan for directing a blast of air in two directions so that the same fan blows the dirt and chaff from the timothy seed after they are separated. The direction and strength of the blast of air through both the clover and timothy seed may be completely controlled by means of the wings 26 and the sliding covers 30.

It will be understood that changes may be made in the details of the construction of my device without departing from its essential features and it is my intention by this application to cover any such changes in construction which may be included within the scope of the appended claims:

I claim as my invention:

1. In a device of the class described, a casing, a hopper above the forward end thereof to deliver grain to the interior of the casing, a series of parallel screens inclined downwardly from the hopper end of the machine and extending substantially to the other end thereof, said screens being made with holes varying in size from the largest in the upper screen to the smallest in the lower screen, the upper halves of the screens below the top ones having holes smaller than those in the lower halves, solid bottoms beneath the upper halves of the lowermost screen parallel therewith, a screen arranged to receive the grain from the delivery end of the forward bottom, inclined downwardly and forwardly, a screen arranged beneath the delivery end of said last screen and inclined downwardly and rearwardly, one of said bottoms arranged below and parallel to the lowermost one of said first series of screens, extending from a point near the middle thereof to a point spaced from the lower end thereof, and a screen below the delivery end of the last screen inclined downwardly and forwardly.

2. In a device of the class described, a casing, a hopper above the forward end thereof to deliver grain to the interior of the casing, a series of parallel screens inclined downwardly from the hopper end of the machine and extending substantially to the other end thereof, said screens being made with holes varying in size from the largest in the upper screen to the smallest in the lower screen, the upper half of the screen below the top one having holes smaller than those in the lower half, a solid bottom beneath the upper half of the lowermost screen parallel therewith, a screen arranged to receive the grain from the delivery end of said last screen and inclined downwardly and forwardly, a bottom arranged below and parallel to the lowermost one of said first series of screens, extending from a point near the middle thereof to a point spaced from the lower end thereof, a screen below the delivery end of the last screen inclined downwardly and forwardly, and a fan arranged to deliver a blast of air through the grain falling from the second bottom and also to deliver a blast of air through the grain falling from the screen below the first bottom.

Des Moines, Iowa, June 20, 1913.

RALPH W. TIPTON.

Witnesses:
L. ROBINSON,
L. J. BARNEY.